United States Patent
Teng et al.

(10) Patent No.: US 9,460,527 B2
(45) Date of Patent: Oct. 4, 2016

(54) PATTERN MODE FOR FRAME BUFFER COMPRESSION

(71) Applicant: QUALCOMM Incorporated, San Diego, CA (US)

(72) Inventors: Chia-Yuan Teng, San Diego, CA (US); Natan Haim Jacobson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 14/170,463

(22) Filed: Jan. 31, 2014

(65) Prior Publication Data

US 2014/0219573 A1 Aug. 7, 2014

Related U.S. Application Data

(60) Provisional application No. 61/760,460, filed on Feb. 4, 2013.

(51) Int. Cl.
*G06T 9/00* (2006.01)
*H04N 19/94* (2014.01)

(52) U.S. Cl.
CPC .............. *G06T 9/00* (2013.01); *H04N 19/94* (2014.11)

(58) Field of Classification Search
None
See application file for complete search history.

(56) References Cited

U.S. PATENT DOCUMENTS

| 5,463,701 | A | 10/1995 | Kantner, Jr. et al. |
| 5,930,387 | A | 7/1999 | Chan et al. |
| 6,320,981 | B1 | 11/2001 | Yada |
| 6,625,323 | B2 | 9/2003 | Henderson et al. |
| 7,039,241 | B1 | 5/2006 | Van Hook |
| 7,085,420 | B2 | 8/2006 | Mehrotra |
| 7,668,382 | B2 | 2/2010 | Wu et al. |
| 8,243,340 | B2 | 8/2012 | McDowell et al. |
| 8,351,699 | B2 | 1/2013 | Li et al. |
| 2003/0012446 | A1 | 1/2003 | Thomas et al. |
| 2004/0062445 | A1 | 4/2004 | Kim et al. |

(Continued)

FOREIGN PATENT DOCUMENTS

| EP | 1079635 A1 | 2/2001 |
| EP | 2265029 A1 | 12/2010 |
| WO | WO-2013006370 A1 | 1/2013 |

OTHER PUBLICATIONS

International Written Opinion—PCT/US2014/014471—IPEA/EPO—Jan. 22, 2015.

(Continued)

*Primary Examiner* — Bernard Krasnic
(74) *Attorney, Agent, or Firm* — Knobbe, Martens, Olson & Bear LLP

(57) ABSTRACT

Certain aspects relate to systems and techniques for compressing image data using pattern mode compression schemes. A pattern mode compression scheme can reduce the amount of data stored in a frame buffer to reduce power costs of an image display system. In some implementations, pattern mode compression can be suitable for compression of pixel blocks having a limited color palette with one or more pixels of a different foreground color, and a slope-enabled pattern compression can be suitable for compression of pixel blocks having a gradient. Input pixel values can be compared against a dynamically-populated, fixed size pattern entry database to determine whether pattern mode compression or slope-enabled pattern mode compression should be used to compress the image block.

11 Claims, 8 Drawing Sheets

(56) References Cited

U.S. PATENT DOCUMENTS

| | | |
|---|---|---|
| 2009/0148059 A1 | 6/2009 | Matsuda |
| 2009/0245630 A1 | 10/2009 | Johnston |
| 2010/0046628 A1 | 2/2010 | Bhaskaran et al. |
| 2010/0128286 A1 | 5/2010 | Amir et al. |
| 2010/0142829 A1* | 6/2010 | Guleryuz ............ G06K 9/6255 382/209 |
| 2012/0275697 A1 | 11/2012 | McDowell et al. |
| 2013/0010864 A1 | 1/2013 | Teng |
| 2014/0219558 A1 | 8/2014 | Teng et al. |

OTHER PUBLICATIONS

Chaddha, N., et al., "Text segmentation in mixed-mode images", Signals, Systems and Computers, 1994. 1994 Conference Record of the Twenty-Eighth Asilomar Conference on Pacific Grove, CA, USA, Oct. 31-Nov. 2, 1994, Los Alamitos, CA, USA, IEEE Comput. Soc, US, vol. 2, Oct. 31, 1994 (Oct. 31, 1994), pp. 1356-1361, XP010148798.

Chen, J., et al., "Adaptive linear prediction for block-based lossy image coding", Image Processing (ICIP), 2009 16th IEEE International Conference on, IEEE, Piscataway, NJ, USA, Nov. 7, 2009 (Nov. 7, 2009), pp. 2833-2836, XP031629140.

International Search Report and Written Opinion—PCT/US2014/014471—ISA/EPO—Jul. 2, 2014.

Jeon, B et al, "Description of Video coding technology proposal by LG Electronics", 1. JCT-VC Meeting; Apr. 15, 2010-Apr. 23, 2010; Dresden, Germany; (Joint Collaborative Team on Video Coding of ISO/IEC JTC1/SC29/WG11 and ITU-TSG.16 ); URL:http://wftp3.itu.int/av-arch/jctvc-site/, Apr. 13, 2010 (Apr. 13, 2010), XP030007545, pp. 1-35.

Li, G., et al., "Integration of Plane Mode with Multiple Predictor Sets in Intra Prediction for video coding", Circuits and Systems (ISCAS), 2011 IEEE International Symposium on, IEEE, May 15, 2011 (May 15, 2011), pp. 617-620, XP031997707.

* cited by examiner

PATTERN MODE FOR FRAME BUFFER COMPRESSION

CROSS-REFERENCE TO RELATED APPLICATIONS

The present application claims the benefit under 35 U.S.C. §119(e) of U.S. Provisional Patent Application No. 61/760,460, filed on Feb. 4, 2013, entitled "PATTERN MODE FOR VISUALLY-LOSSLESS LOW-COMPLEXITY FRAME BUFFER COMPRESSION," the entire contents of which is hereby incorporated by reference herein in its entirety and for all purposes. The present application is related to U.S. patent application Ser. No. 14/170,456, filed Jan. 31, 2014, entitled "MIXED MODE FOR FRAME BUFFER COMPRESSION."

TECHNICAL FIELD

The systems and methods disclosed herein are directed to image data, and, more particularly, to the compression of image data.

BACKGROUND

Even handheld computing devices such as mobile phones and tablets now demand high-resolution, high-color displays, thus requiring high-wattage backlight lamps and large-capacity frame buffer memories which together lead to high power consumption. The frame buffer, the area of memory that stores fragments of data during rasterization of an image on a display, is a big consumer of both memory bandwidth and storage space, and this can put adversely impact the memory subsystem of a graphics processing unit (GPU). In addition, together with the display backlight, frame buffers consume a significant percentage of a device's power. Particularly in mobile devices with limited battery life, frame buffer power consumption can present significant challenges in light of the high refresh rate, resolution, and color depth of displays. Thus, reducing frame buffer activity helps to extend overall battery life.

Accordingly, frame buffer compression (FBC) is becoming increasingly popular for rendering images on the displays of high-resolution mobile phone and tablet devices. This applies both to regular panels, where FBC can reduce the required link rate, as well as to smart panels, where FBC can reduce both the link rate and panel memory requirement, saving cost. Some approaches to FBC can reduce the number of accesses to the frame buffer, thereby reducing power costs. The power consumption of the frame buffer and its associated buses is proportional to the number of frame buffer accesses during rasterization. The number of accesses is in turn determined by the screen resolution, the refresh rate, and the color depth. Power consumption of the frame buffer is also inversely proportional to the compression ratio.

As display size and resolution continues to increase, there is increased demand for higher compression ratios in frame buffer compression. Even as the demands on compression FBC techniques increase, the requirements of FBC continue to be (1) low-complexity, in that the driver integrated circuit of the mobile device can implement compression and decompression with limited computational resources, (2) visually lossless quality, in that the user should not see any visual degradation in the image due to compression and decompression, and (3) a fixed compression rate.

SUMMARY

In general, this disclosure is related to techniques for data compression so that the amount of data that needs to be stored in a frame buffer or transmitted is reduced. Some embodiments relate to systems and techniques for compression of certain image blocks, referred to herein as "pattern mode," where the image blocks contain pixels adhering to a limited palette, gradient pattern or an overall gradient or flat area with one or more pixels belonging to a foreground object having a different color. Such pixel blocks are very difficult to compress with high visual quality using existing FBC methods such as prediction or basis transform. Using pattern mode can provide lossless or substantially lossless coding at a high compression ratio, reducing the activity of the frame buffer and associated buses during rasterization and therefore also reducing power consumption without sacrificing visual quality. In addition, pattern mode can be useful for coding graphics content containing either a limited palette, a gradient, or a combination of these two. Pattern mode can be used either independently or along with other components as part of a frame buffer compression algorithm. One embodiment can relate to criterion for selecting pattern mode over other compression modes in the case of pattern mode compression being used in conjunction with other types of compression modes.

Pattern mode has many advantages over existing FBC techniques regarding quality as well as efficiency and corresponding memory and power consumption. For example, pattern mode can provide high visual quality compression for blocks which are otherwise difficult to compress. In addition, pattern mode is block based, processing only on N-pixel array, resulting in almost no delay. Another advantage is that pattern mode can employ a fixed number of patterns as well as a maximum number of new patterns per block. Because the number of patterns is fixed, each pattern can be indexed using a fixed length 2-bit code. Further, patterns originate from the neighboring pixels and the current block, so there is no need for the encoder or decoder to maintain a pattern database between blocks. As described hereinbelow, the pattern mode algorithm can be done in one pass and does not involve any recursion, and is therefore efficient for small data, due to the avoidance of repeated function calls and returns. In addition, pattern mode provides support for both lossless or lossy compression by enabling and disabling a slope-enabled pattern mode. Other advantages include that pattern mode does not require a line buffer and that it requires low computational complexity, as only the operators "+", "<<", and ">>" are used with no multiplication and no division.

One aspect relates to a system in an electronic device for compressing image data, the system comprising a pattern module configured to receive a pixel block comprising a plurality of pixels, dynamically generate a pattern database comprising a plurality of entries, wherein each entry includes a pattern code value associated with an index code, perform a pattern search by comparing a pixel pattern value generated from a color value of each of the plurality of pixels to the plurality of entries in the pattern database, and update the pattern database with new pattern entries based on the color values of the plurality of pixels, wherein the pattern module is being further configured to terminate the pattern search if greater than a threshold number of the plurality of pixels are determined to correspond to new pattern entries, and a pattern mode coding module configured to generate a compressed pixel block using pattern encoding based at least partly on results of the pattern search.

Another aspect relates to a method for compressing image data in an electronic device, the method comprising receiving a pixel block having a plurality of pixels, each of the plurality of pixels associated with a color value; generating a pattern database comprising a plurality of entries, the pattern database having a maximum number of available entry locations, a populated entry of the plurality of entries including a database pattern value associated with an index code; performing a pattern search by comparing a pixel pattern value generated from a color value of a searched pixel of the plurality of pixels to the database pattern value of at least a first populated entry in the pattern database; determining whether the pixel pattern value is equal to the database pattern value; associating the searched pixel with the index code in a corresponding populated entry if the pixel pattern value is equal to the database pattern value; and updating the pattern database with a new pattern entry based on the color value of the searched pixel if the pixel pattern value is not equal to the database pattern value.

Another aspect relates to a non-transitory computer-readable medium storing instructions that, when executed, cause at least one physical computer processor to perform a method of compressing image data, the method comprising generating a pattern database comprising a plurality of entries, the pattern database having a maximum number of available entry locations, a populated entry including a database pattern value associated with an index code; performing a pattern search of a pixel block comprising a plurality of pixels by comparing a pixel pattern value generated from a color value of a searched pixel of the plurality of pixels to the database pattern value of at least a first populated entry in the pattern database; determining whether the pixel pattern value is equal to the database pattern value; and updating pattern data including one or both of the pattern database and association of searched pixels with corresponding index codes.

Another aspect relates to an apparatus for compressing image data in an electronic device, the apparatus comprising means for generating a pattern database comprising a plurality of entries up to a maximum number of available entries, a populated entry including a database pattern value associated with an index code; means for performing a pattern search of a pixel block comprising a plurality of pixels by comparing a pixel pattern value generated from a color value of a searched pixel of the plurality of pixels to the database pattern value of at least a first populated entry in the pattern database; and means for updating pattern data based at least partly on whether the pixel pattern value is equal to the database pattern value, the pattern data including one or both of the pattern database and association of searched pixels with corresponding index codes.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1:
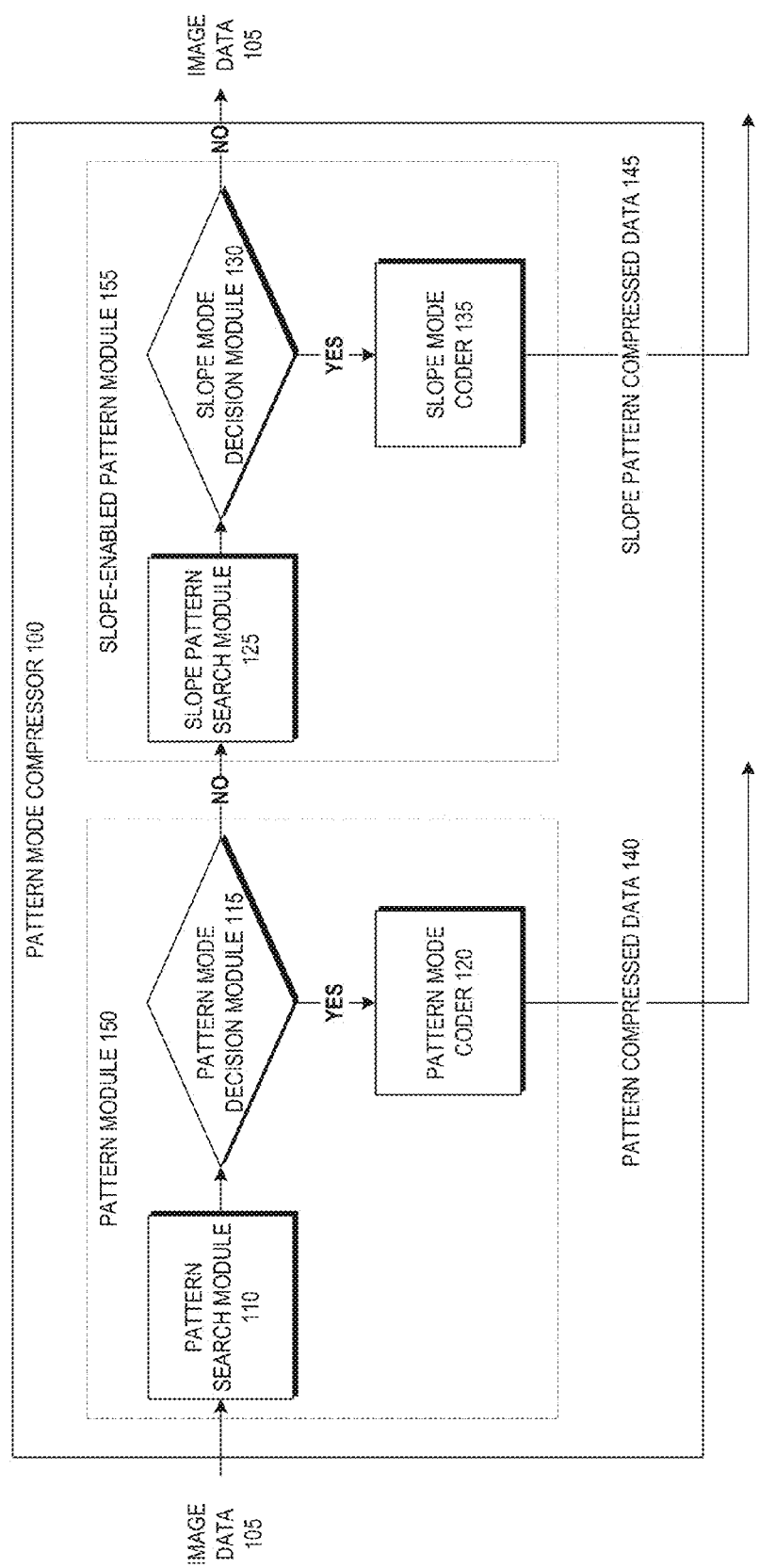
FIG. 1 illustrates a schematic block diagram of an embodiment of a pattern mode compression system.

Embodiments of the disclosure relate to techniques for compression of image data or other graphical data in a frame buffer. The pattern mode compression scheme disclosed herein is useful for coding graphics content which either contains a limited palette (e.g., few distinct pixel values), a gradient, or a combination of limited palette and gradient. One example of the pattern mode compression scheme includes three steps: first, performing a pattern search to detect a number of patterns in a block, second, a slope-enabled pattern search performed to detect a number of patterns in a block with a gradient if the pattern search detects more than a threshold number of patterns, and third, pattern coding to compress the block according to either pattern mode or slope-enabled pattern mode. By compressing the data, the techniques described in this disclosure may reduce the amount of data that needs to be stored in a frame buffer and/or reduce the amount of data that needs to be transmitted. In other words, without compression the amount of data that needs to be stored in the frame buffer and/or transmitted may be greater than the amount of data that needs to be stored in the frame buffer and/or transmitted with compression, leading to larger delay times and higher power consumption.

As a few examples, image frames may be pictures of video content composed by a video decoder, graphics content composed by a graphics processing unit (GPU), or images captured by a camera and composed by a camera processor. In general, an image frame may be any example of image content that is to be displayed on a display including the results of executing applications that generate viewable content such as web browsers, games, media players, and the like.

A compression unit, including a pattern mode compression module, may receive the pixel values for pixels of the composed image frame from any one of the video decoder, GPU, and camera processor. Each of the pixel values may be represented by a plurality of data bits. For instance, one example of the pixel values may be color values that include data bits for red, green, and blue (RGB) components. As an example, eight data bits may represent the red component of a pixel, eight data bits may represent the green component of a pixel, and eight data bits may represent the blue component, for a total of 24 bits for the color value. Often known as "truecolor," 24-bit color is the highest color depth normally used, and is available on most modern display systems and software. For this reason, embodiments of the invention are discussed herein in the context of 24-bit RGB. However, in other embodiments, other color spaces can be used such that the pixel values require of fewer or greater than 24-bits. For example, some newer graphics cards support 30-bit RGB and higher. In systems for display of multispectral or stereoscopic image data, the number of bits per pixel can also vary from the example given of 24 bits.

The compression unit may receive the data bits of the pixel values for each of the pixels in the image frame, and apply compression so that fewer bits are needed to represent the color value of each pixel. The compression unit may similarly compress other types of pixel values such as opacity values and coordinates, as two examples. As used in this disclosure, the term "image data" may refer generally to bits of the pixel values, and the term "compressed image data" may refer to the output of the compression unit after compression unit compresses the image data. For example, the number of bits in the compressed image data may be less than the number of bits in the image data. In some embodiments, the compression unit may receive the pixel values in blocks, and "image data" may refer to blocks of pixels of the original image.

To compress the image data, the compression unit may implement a pattern mode compression scheme. The compression unit may implement the pattern mode compression scheme to the entirety of the image frame, a slice of the image frame, block-by-block, or line-by-line. As described in more detail, in accordance with the pattern mode compression scheme, the compression unit may compare the values within pixel blocks to a fixed-size pattern database and encode recognized pixel values with a short index associated with its entry in the database in order to achieve the target compression.

In one example, a maximum number of patterns can be considered by the compression unit, where each pattern represents the RGB (red, green, blue) color of a pixel in a single 24-bit code. The pattern mode compression scheme can check each of the pixels in a block to determine if the block is a candidate for pattern mode compression. If the block is not a candidate for pattern mode compression, some other method, such as Pulse Code Modulation (PCM) may be used to encode the block. If the values of pixels within the block indicate that it is a good candidate for pattern mode compression, then each pixel in the block can be coded by its index in a fixed-size pattern database. As such, pattern mode compression allows for a high compression ratio due to the coding of pixels by a short index (usually 2 bits), rather than the original 24-bit values. An additional type of pattern mode compression, slope-enabled pattern mode, can allow for a high compression ratio of blocks containing a smooth gradient.

In some examples, the compression unit may compress the image data utilizing various compression techniques including pattern mode and slope-enabled pattern mode compression techniques, among others. The compression unit may determine which type compression technique should be applied to the image data, and compress the image data based on the determined compression technique.

Overview of Pattern Mode Compression

FIG. 1 illustrates a schematic block diagram of an embodiment of a pattern mode compression system 100 including a pattern module 150 and a slope-enabled pattern module 155. The pattern module 150 can include a pattern search module 110, a pattern mode decision module 115, and a pattern mode coder 120. The slope-enabled pattern module 155 can include a slope pattern search module 125, a slope mode decision module 130, and a slope mode coder 135.

Image data 105 can be input into the pattern module 150 of the pattern compressor 100 for an initial determination of whether to code the image data 105 according to pattern mode. The pattern search module 110 can compare each pixel in a current block of the image data 105 against entries in a pattern database. In some embodiments, pattern compressor 100 or the pattern module 150 can separate image data 105 into blocks. In other embodiments, the image data 105 can be segmented into blocks prior to transmission to the pattern compressor 100. For purposes of illustration, embodiments discussed herein use image blocks of the size 8×1 pixels, however in other embodiments other block sizes can be used.

For each block, the components of the pattern module 150 can consider a maximum number of patterns, where each pattern represents the RGB color of a pixel in a single 24-bit code. The block can be searched from left to right in one embodiment, and the value of each pixel can be compared to a plurality of entries in a pattern database. In one example, each pattern database entry can contain a 24-bit code corresponding to an RGB color and an associated fixed-length 2-bit index code. In this example there is a maximum of two new patterns per block, as the 2-bit index code can only accommodate four separate entries. However, in other embodiments, a longer fixed-length index code can be associated with each pattern database entry to accommodate a larger pattern database. In one embodiment, two initial pattern database entries can be generated by using the RGB color values of the last two pixels of a previous block, which are placed into pattern slots 0 and 1. Further pattern values can be generated by color values in the current block that are different from the pattern database entries. In some embodiments, the pattern database entries can be populated solely based on color values in the current block. Because patterns are generated adaptively based on the previous and current pixel blocks, there is no need for the encoder or decoder to maintain a pattern database between blocks. The database can be stored in a frame buffer in some embodiments.

The pattern search module 110 can search a pixel by calculating the pattern corresponding to the pixel color value and comparing the pattern to the entries in the pattern database. In one embodiment, if the pattern search module 110 finds an entry corresponding to the pixel pattern in the pattern database, then pixel can be associated with the corresponding pattern index for later coding. For example, the pattern module 150 can build a block pattern index Block PAT_IDX={0, 0, 0, 2, 2, 0, 0, 1} indicating the index corresponding to each of pixels 0 to 7 in examples of pixel blocks having 8 pixels. If the pattern module 150 does not find an entry corresponding to the pixel pattern in the pattern database, the pixel pattern can be added to one of two available new pattern slots. If at any point the number of new patterns exceeds two, then the pattern mode decision module 115 can terminate the search and slope-enabled pattern mode can be attempted, as will be discussed in more detail below.

If the number of new patterns is two or fewer, then the pattern mode decision module 115 can send the image data and/or pattern database data to the pattern mode coder 120. Pattern mode coder 120 can code each pixel using the 2-bit index associated with the corresponding pattern index. After a successful pattern search, pattern mode coder 120 can code the pixel block according to the following example, in some embodiments. A pattern header can be configured as required by the overall encoder/decoder design. The first field after the header can contain the number of new patterns for the block. This can be 0, 1, or 2. For each new pattern in the block, a 24 bit PAT code can be calculated and stored in the bitstream. Finally, the pattern index for each pixel can be encoded in a 2 bit field. Further details regarding coding image data in pattern mode are discussed with respect to FIG. 5.

If pattern mode is terminated by the pattern mode decision module 115, then the image data 105 can be sent to the slope-enabled pattern module 155. Slope-enabled pattern mode can be useful for coding blocks which contain a gradient, as such blocks may fail the pattern mode search since every pixel value in the block is likely to have a distinct color value. The slope-enabled pattern module 125 can quantize each RGB pixel in the block using a fixed quantizer, and then the slope pattern search module 125 can subject the quantized pixels to a pattern search as described above with respect to the pattern search module 110. If at any point the number of new patterns exceeds two, then the slope mode decision module 130 can terminate the search, disable pattern mode compression for the current block, and output the block of image data 105 for compression using a different technique. Accordingly, in some examples, some blocks in the image data 105 can be coded using pattern mode and/or slope-enabled pattern mode, while other blocks can be coded using other techniques.

If the pattern search of the quantized values is successful, that is, there are two or less new patterns in the quantized values, then the slope mode decision module 130 can send the image data and/or pattern data to the slope mode coder 135. Pattern data as used herein can refer to the association of pixels with pattern entry index codes as well as pattern codes in the pattern database. Slope mode coder 135 can test each color channel (e.g., red, green, and blue) for gradient direction by searching for runs of the same pattern index in the pixel block and then comparing the actual pixel values at the endpoint of each run to determine a slope between the pixels. A run can be defined as the number of contiguous pixels in a block which are assigned the same pattern. In one example, if the pattern indices of a 8×1 block are PAT_IDX={0,0,0,1,2,2,0,0}, then the run from the leftmost pixel will be 3, and the run from the rightmost pixel will be 2. A slope can be defined as the difference in gradient values between a starting pixel and an end pixel. The slopes for the R, G, and B channels can be calculated between endpoints of the block.

After a successful slope pattern search, slope mode coder 125 can code the pixel block according to the following slope-enabled pattern mode example, in some embodiments. As discussed above with respect to pattern mode coding, a pattern header can be configured as required by the overall encoder/decoder design, and the first field after the header can contain the number of new patterns for the block. Next, a slope flag can be set to 1 to indicate that slope-enabled pattern mode was used. For each new pattern in the block, a 24 bit PAT code is calculated and stored in the bitstream, and then four 2-bit fields can be added to the bitstream containing the starting pattern index for slope-enabled pattern mode and the slope values for each of the R, G, B channels. Finally, the pattern index for each pixel will be encoded in a 2 bit field. Further details regarding coding image data in pattern mode are discussed with respect to FIG. 5.

Although the pattern mode coder 120 and slope mode coder 135 are illustrated as being separate modules, in some embodiments pattern mode coding and slope-enabled pattern mode coding can be performed by the same module. The pattern compressed data 140 and the slope pattern compressed data 145 can be transmitted for storage in a frame buffer in some embodiments.

System Overview

Figure 2A:
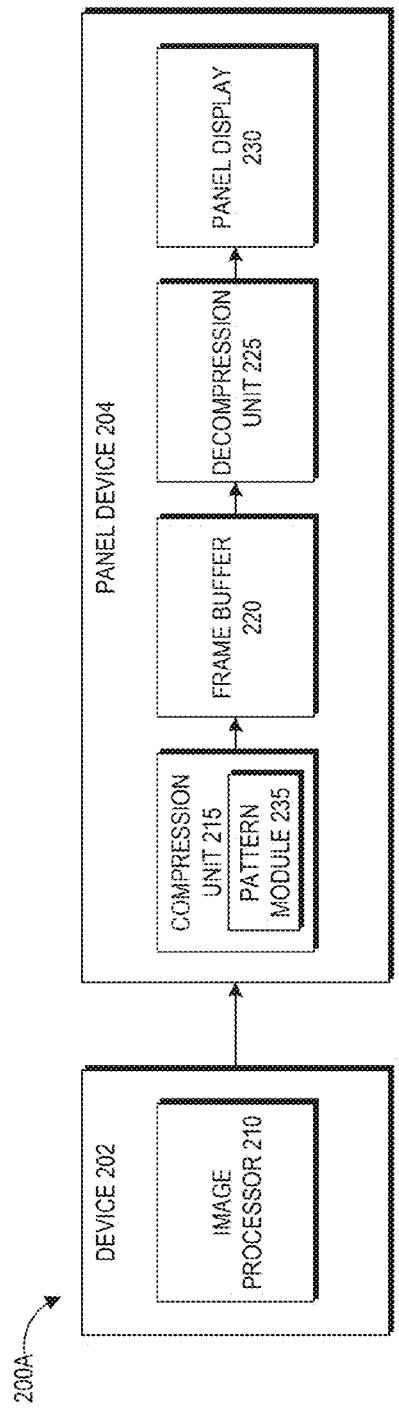
FIGS. 2A-2C illustrate schematic block diagrams of example systems that can implement the compression techniques described in this disclosure.
Figure 2B:
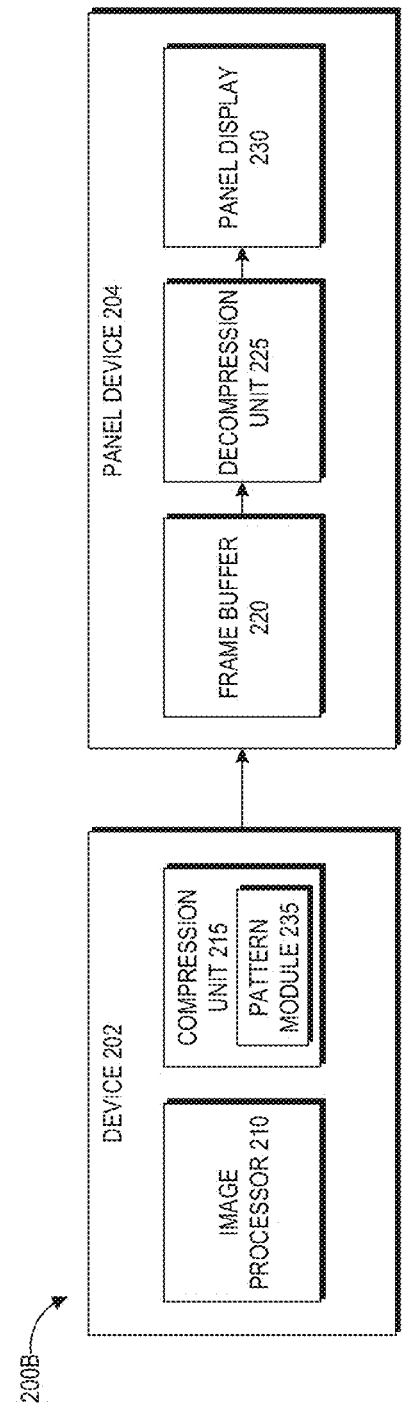
Figure 2C:
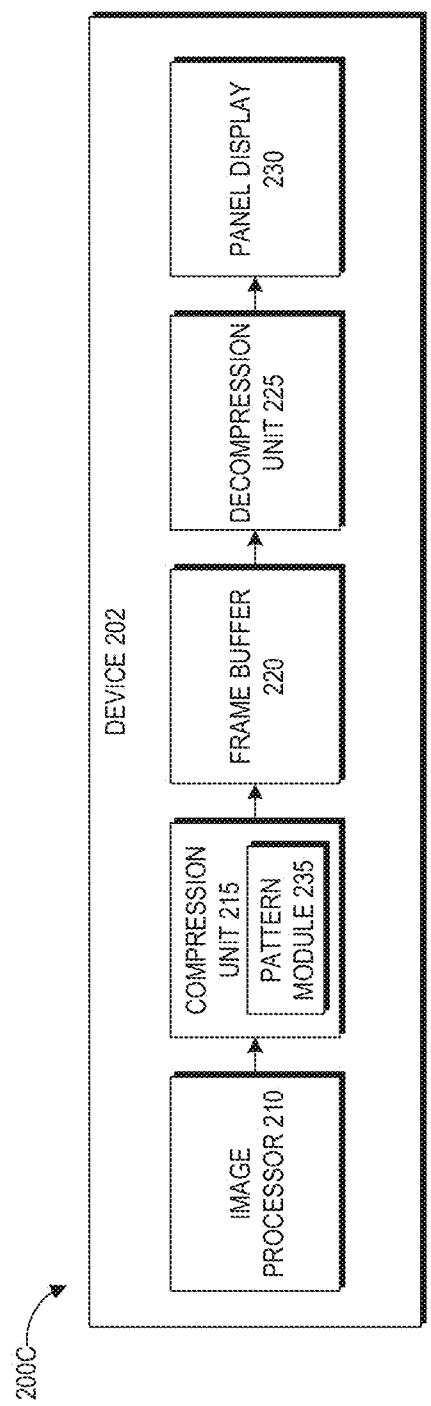

FIGS. 2A-2C illustrate schematic block diagrams of example systems that can implement the compression techniques described in this disclosure. For instance, FIGS. 2A-2C illustrate systems 200A-200C, respectively. In FIG. 2A and FIG. 2B, systems 200A and 200B include device 202 and external panel device 204, and in FIG. 2C, system 200C includes device 202 without an external panel device 204. Together, device 202 and panel device 204 include components such as the image processor 210, compression unit 215, frame buffer 220, decompression unit 225, and panel display 230. The compression unit 215 can include pattern module 235.

Examples of device 202 include, but are not limited to, mobile computing devices such as cell phones, digital cameras, tablet computers, media players, personal digital assistant, wireless handset, gaming console, or the like. Device 202 may also be a more stationary device such as a desktop personal computer, video conferencing station, set-top box, or the like. Examples of the panel device 204 include, but are not limited to, televisions, monitors, liquid crystal displays (LCDs), light-emitting diode displays (LEDs), organic LEDs (OLEDs), plasma displays, display screens of any of the video devices mentioned above, or generally any device that displays images.

In systems 200A-200C, device 202 includes image processor 210. Image processor 210 may be any component that generates a fully composed image frame. An image frame may be any viewable content that is to be displayed including the results of executing applications that generate viewable content. For instance, examples of image processor 210 include, but are not limited to, any one or more of a video decoder, a graphics processing units (GPU), and a camera processor. Examples of image frames include, but are not limited to, any one or more of a picture of video content composed by the video decoder, graphics content composed by the GPU, or an image captured by a camera and composed by the camera processor.

An image frame may include pixel values for a plurality of pixels. For instance, the image frame in one embodiment may be represented by a two-dimensional array of pixel values, where each pixel value may correspond to one pixel of panel display 230. For example, panel display 230 in systems 200A, 200B, and 200C may display the image frame, and panel display 230 may illuminate its pixels based on the corresponding pixel values of the image frame.

The pixel values of the image frame may be defined by a plurality of digital bits. Pixel values can be, for example, brightness values or color values. Color values are generally defined by red, green, and blue (RGB) components although other color spaces can also be used. In some examples, image processor 210 may define each of the red, green, and blue components using 8 bits, for a total of 24 bits associated with each pixel in the RGB color space. Image processor 210 may similarly represent other examples of pixel values such as opacity values and pixel coordinates with digital bits. For purposes of illustration and ease of description, the techniques described in this disclosure are described in context of the color values that are represented by RGB components. However, aspects of this disclosure are not limited to processing RGB pixels, and the techniques described herein may be extended to examples where a pixel value is defined by more or fewer than 24 bits.

The image processor 210 may transmit the pixel values to compression unit 215. In the example of FIG. 2A, compression unit 215 may reside within the external panel device 204, and in the examples of FIGS. 2B and 2C, compression unit 215 may reside within device 202. In the examples of FIGS. 2A-2C, although compression unit 215 is illustrated as being external to image processor 210, in other examples, compression unit 215 may be a part of image processor 210.

In the example of FIGS. 2A and 2B, device 202 and external panel device 204 may be coupled wirelessly or with a wired link that may be used to transmit data from the image processor 210 to the compression unit 215. As one example of the wired link, device 202 and external panel device 204 may be coupled by a High Definition Multimedia Interface (HDMI) cable. In the examples of FIGS. 2B and 2C, image processor 210 can transmit the pixel values to compression unit 214 via a system bus of device 202 that interconnects the various components of device 202. In examples where the image processor includes the compression unit, the image processor can transmit the pixel values to the compression unit without requiring the system bus.

Compression unit 215 can be configured to receive the pixel values generated by image processor 210 and can include instructions to apply compression. As described above, the pixel values may be a plurality of bits that represent the color. Compression unit 215 may apply compression so that fewer bits are needed to represent the color. As an example, as described above, one pixel value can be 24 bits; therefore, a block of eight pixel values is 192 bits. In this example, if 50% compression is desired, compression unit 215 receives the 192 bits and applies compression to reduce the total number of bits to 96 bits. To compress the image data, compression unit 215 may implement a pattern mode compression scheme using pattern module 255 on blocks of the image data, as discussed in more detail above and below. As an example, one block of image data may be eight pixel values; however, in other embodiments a block can be fewer or greater than eight pixels.

Using the pattern module 235, compression unit 215 may achieve true real time compression. For example, pattern module 235 can be able to compress the image data in a single pass, rather than requiring multiple passes. In other words, as soon as pattern module 235 compresses an image data block, the bits of the compressed image data block may be transmitted or stored immediately. Furthermore, compression unit 215 may not require large blocks of memory for compression. For instance, it is possible to reduce the size of the frame buffer 220 with pattern module 235. In addition, the pattern mode compression scheme implemented by pattern module 235 does not require extensive memory for storage, and accordingly the pattern mode compression techniques do not negate any reduction in size of frame buffer 220 achieved by pattern module 235. Examples of compression unit 215 include, but are not limited to, any of a variety or general purpose or special purpose processing hardware, such as a digital signal processor (DSP), a general purpose microprocessor, application specific integrated circuit (ASIC), field programmable logic array (FPGA), or other equivalent integrated or discrete logic circuitry.

Compression unit 215 can include instructions to output the compressed image data to frame buffer 220, which can store the compressed image data. An example of frame buffer 220 is random access memory (RAM); however, other types of memory may be possible. By compressing the image data prior to storage in frame buffer 220, the techniques of this disclosure may allow for a reduction in the size of frame buffer 220. In general, the cost of frame buffer 220 is proportional to its size. Accordingly, by compressing the image data with compression unit 215, the cost and size of frame buffer 220 can be reduced compared to examples where no compression is applied. Compression of the image data can also improve bandwidth efficiency for transfer of the image data.

Decompression unit 225 can include instructions to decompress the compressed image data to reconstruct an image that is substantially similar to the original, uncompressed image. For example, the output of decompression unit 225 may be pixel values that are the same as or substantially similar to the pixel values of the image frame that image processor 210 composed. To decompress the compressed image data, decompression unit 225 may apply the inverse of the compression scheme applied by compression unit 215. In some embodiments, compression unit 215 may provide an indication to the decompression unit 225 regarding the manner in which the image data was compressed, which allows decompression unit 225 to determine the appropriate manner in which to decompress the compressed image data. The compression unit 215 may apply either lossless or lossy compression. With lossless compression, decompression unit 220 may be able to decompress the compressed image data such that the resulting image data is virtually identical to the original image data. With lossy compression, decompression unit 225 may not be able to decompress the compressed image data such that the resulting image data is identical to the original image data. However, even with lossy compression, the decompressed image data may be similar, and potentially substantially similar, to the original image data.

Panel 230 may be any type of display. For instance, examples of panel 230 include, but are not limited to, a liquid crystal display (LCD), a light-emitting diode display (LED), an organic light emitting diode display (OLED), a cathode ray tube (CRT) display, a plasma display, or another type of display device. Panel 230 may include a plurality of pixels that are illuminated to display the viewable content of the image frame composed by image processor 210. The pixel values output by decompression unit 225 can indicate the manner in which the pixels of panel 230 are to be illuminated. Although not illustrated, in some embodiments, decompression unit 225 may be coupled to a display processor, and the display processor may be coupled panel 230. In these embodiments, the display processor may determine the voltage that is to be applied to the pixels of panel 230 so that, when illuminated, the pixels present the desired color. In the examples of FIGS. 2A and 2B, the components of external panel device 204, excluding panel 230, may be considered as a driver for panel 230.

Overview of Example Pattern Search

Figure 3:
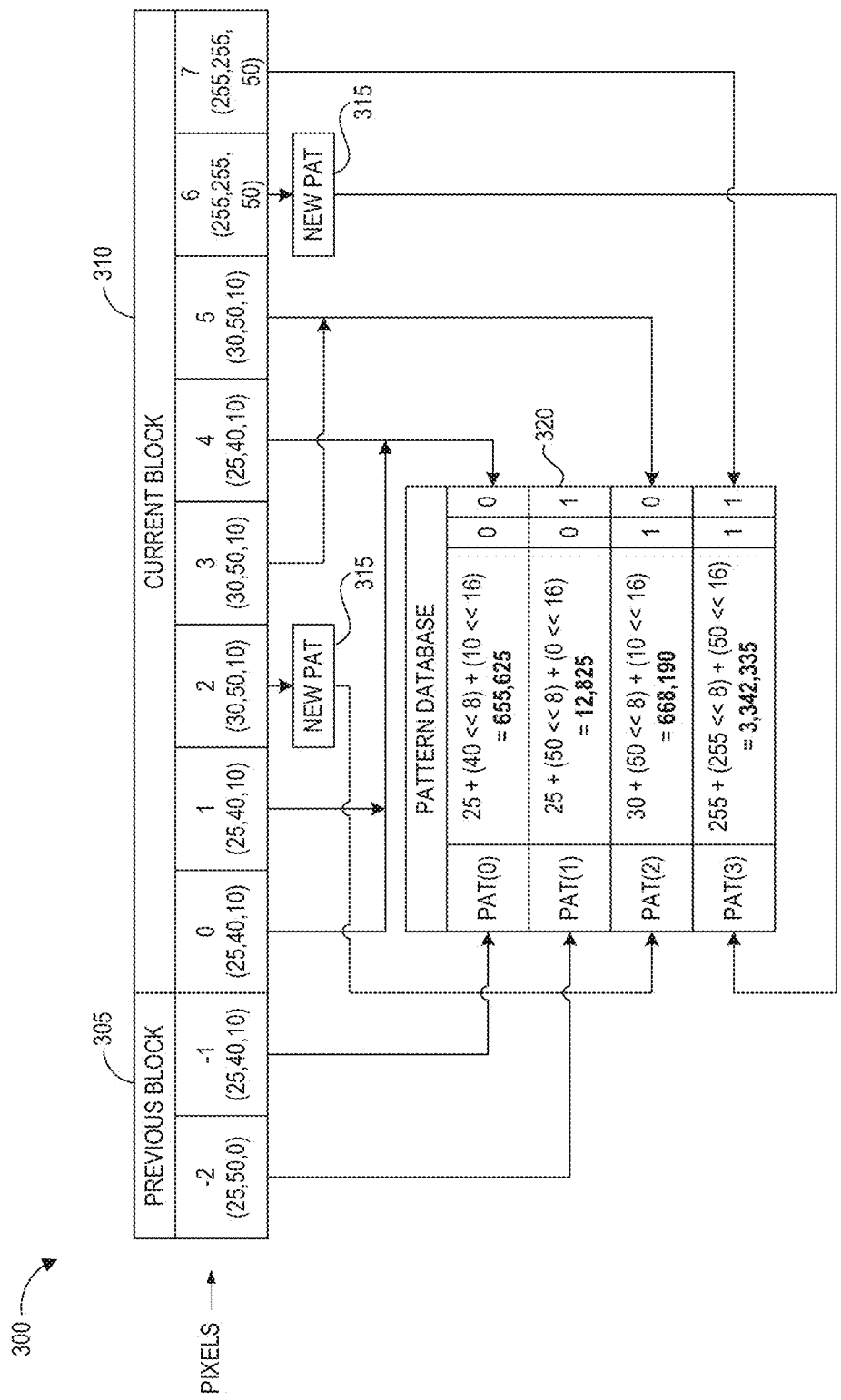
FIG. 3 illustrates an example of a block pattern search.

FIG. 3 illustrates an example of a block pattern search 300 that can be implemented on actual or quantized pixel values. As discussed above, the pattern search compares a pattern corresponding to the RGB color value or quantized RGB color value of each pixel in a current block 310 against the entries in the pattern database 320. The block pattern search 300 can be implemented in the pattern search module 110 and slope pattern search module 125 of FIG. 1, and can be implemented in the pattern module 235 of the compression unit 215 of FIGS. 2A-2C.

In this example, initially, the two rightmost pixels of a previous block 305 of image data can be placed into the first two entries of the pattern database 320, PAT(0) and PAT(1). Pixel −2, the second-to-left pixel in the previous block 305, has an RGB color value of (25,50,0). As an example, the pattern corresponding to the RGB value of pixel −1 can be calculated as follows by Equation (1) and the pattern can be set to the first pattern entry, PAT(0), and the pattern corresponding to the RGB value of pixel −2 can be calculated as follows by Equation (2) and the pattern can be set to the second pattern entry, PAT(1):

$$25 = (40 >> 3) + (10 << 15) = 565,625 \rightarrow \text{PAT}(0) \quad (1)$$

$$25 + (50 << 8) + (0 << 16) = 12,325 \rightarrow \text{PAT}(1) \quad (2)$$

In the illustrated example, arrows leading in to the left side of pattern database 320 indicate an initial input into a pattern entry, and arrows leading in to the right side of the pattern database 320 indicate associations of existing entries with pixels having matching patterns. In some embodiments, if the current block is the first block analyzed by the pattern search, the first two pattern entries can be populated with a fixed value. For example, the fixed value could be set to a common pixel color value or half of the dynamic range in some embodiments, such as 128. Although both of the first two pattern entries can have the same value in this or other examples, the pattern mode can associate a matching pixel value in the current block to the first pattern entry.

The current block can be searched from left to right, that is from pixel 0 to pixel 7. The patterns of pixels 0 through 7 can be calculated similarly to the patterns calculated in Equations (1) and (2), above. In the illustrated example, the patterns calculated for pixel 0 and pixel 1 correspond to the pattern entry PAT(0), so pixel 0 and pixel 1 are associated with the 2-bit code 00 of PAT(0). The pattern calculated for pixel 2 does not match either of the existing pattern entries, PAT(0) or PAT(1). Accordingly, this is a new pattern as indicated by the NEW PAT block 315. Because there is still available space in the pattern database 320, the next available entry in the pattern database 320, PAT(2), is updated with the pattern of pixel 2.

The pattern calculated for the RGB value of pixel 3 corresponds to the pattern entry PAT(2), so pixel 3 is associated with the 2-bit code 10 of PAT(2). The pattern calculated for the RGB value of pixel 4 corresponds to the pattern entry PAT(0), so pixel 4 is associated with the 2-bit code 00 of PAT(0). The pattern calculated for the RGB value of pixel 5 corresponds to the pattern entry PAT(2), so pixel 5 is associated with the 2-bit code 10 of PAT(2). The pattern calculated for pixel 6 does not match any of the existing pattern entries, PAT(0), PAT(1), or PAT(2). Accordingly, this is a new pattern as indicated by the NEW PAT block 315. Because there is still available space in the pattern database 320, the next and final available entry in the pattern database 320, PAT(3), is updated with the pattern of pixel 6.

The pattern calculated for pixel 7, the final pixel in the block, corresponds to the pattern entry PAT(3), so pixel 7 is associated with the 2-bit code 11 of PAT(3). Because the block was searched and did not contain more new patterns than the available pattern entries in the pattern database 320, the pattern search was successful and the current block can be output for compression using pattern mode. Alternatively, if the values of pixels 0 through 7 were quantized prior to the pattern search, the current block can be output for compression using slope-enabled pattern mode.

The illustrated example block pattern search 300 is provided for explanatory purposes, and it will be understood that different block sizes, block values, pattern values, numbers of additional patterns, and pixel locations of new patterns are possible in other examples. In addition, different numbers of pixels in the previous block 305 can be used to generate initial patterns for the database, for example none in some embodiments such as when a first block is pattern searched. As well, other embodiments may include larger or smaller pattern databases and corresponding pattern index bit sizes based on the encoding needs of the system.

Overview of Example Slope-Enabled Pattern Module

Figure 4:
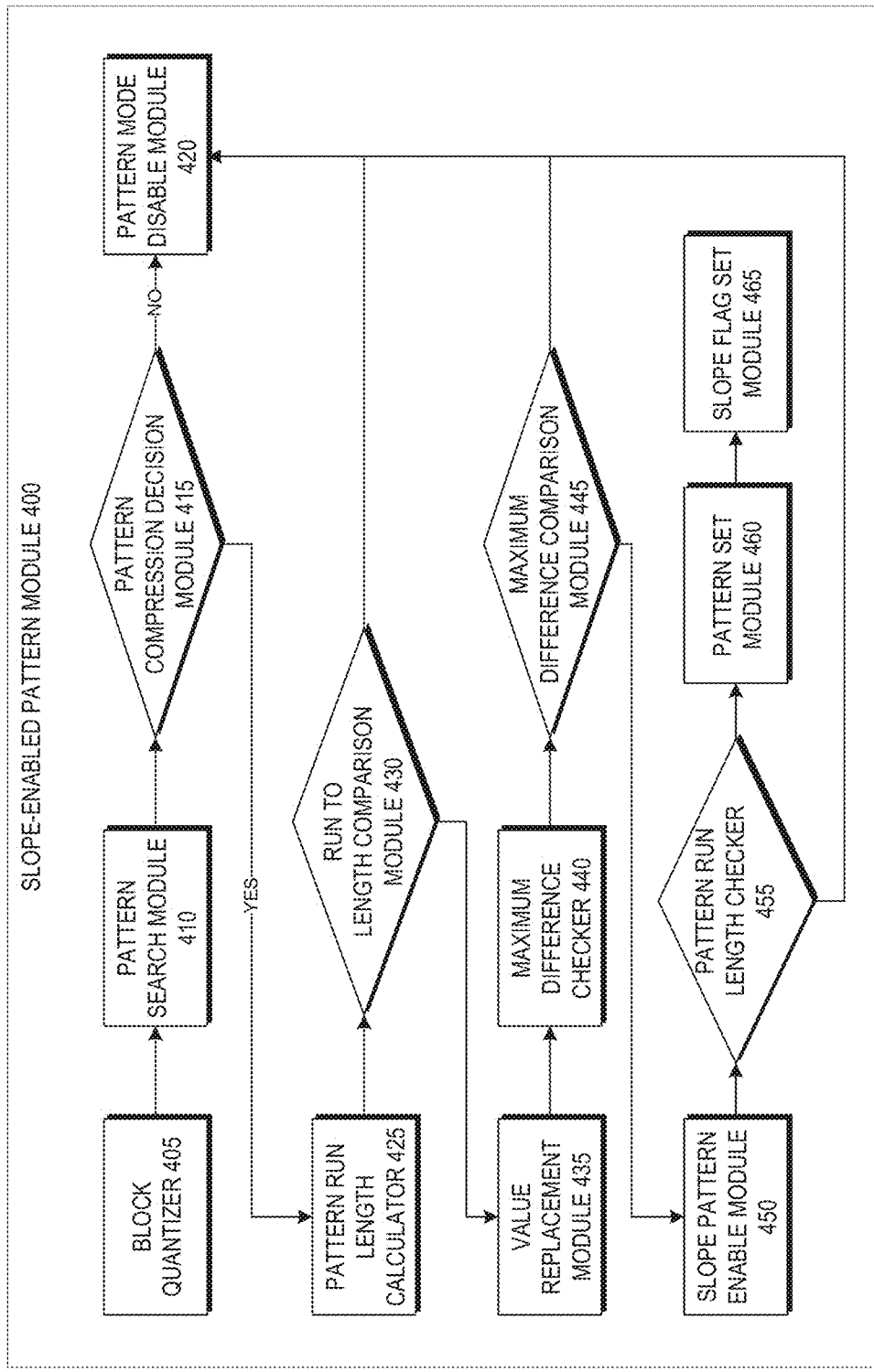
FIG. 4 illustrates a schematic block diagram of an embodiment of a slope-enabled pattern module.

FIG. 4 illustrates a schematic block diagram of an embodiment of a slope-enabled pattern module 400 capable of searching a block of pixels having a gradient according to the pattern search techniques described herein and capable of determining a slope of the pixel block for future compression using slope-enabled pattern mode. The slope-enabled pattern module 400 can be implemented in the pattern mode compressor 100 of FIG. 1 instead of the other embodiment of the slope-enabled pattern module 155, and can be implemented in the pattern module 235 of the compression unit 215 of FIGS. 2A-2C. In some embodiments, the slope-enabled pattern module 400 can operate on image data after failure of a pattern mode search.

The slope-enabled pattern module 400 can include a block quantizer 405, a pattern search module 410, a pattern compression decision module 415, a pattern mode disable module, a pattern run length calculator 425, a run to length comparison module 430, a value replacement module 435, a maximum difference checker 440, a maximum difference comparison module 445, a slope pattern enable module 450, a pattern run length checker 455, a pattern set module 460, and a slope flag set module 465.

The block quantizer 405 can receive image data including a block of pixels, for instance an 8×1 block of pixels. Some embodiments of the block quantizer 405 can quantize the RGB color values of each of the pixels, for example using a fixed quantizer. The fixed quantizer can have a quantization parameter (QP) of four in some examples. The quantized color values can correspond to a reduced number of colors relative to the original color values. The extent of reduction in colors can be varied by changing the changing the quantization parameter in some embodiments.

The resulting quantized pixel values can be subjected to a slope-enabled pattern search, which may follow the steps of the pattern search as described above with respect to FIG. 3, by the pattern search module 410. The pattern search module 410 can communicate with the pattern compression decision module 415 regarding whether the pattern search of the quantized values was successful. If the search was not successful, in that the quantized block was searched and contained more new patterns than the available pattern entries in the pattern database, the pattern compression decision module 415 can communicate with the pattern mode disable module 420 to disable pattern mode for the current block. In some embodiments another compression mode may be used on the block after failure of the slope-enabled pattern search.

If the search was successful, in that the quantized block was searched and did not contain more new patterns than the available pattern entries in the pattern database, the pattern compression decision module 415 can send the block data and/or pattern data to the pattern run length calculator 425 to begin the process of preparing the data for slope-enabled pattern mode compression. Pattern data as used herein can refer to the association of pixels with pattern entry index codes as well as pattern codes in the pattern database. The run length calculator 425 can calculate the length of a pattern run, starting from the left of the block in some embodiments. A run can be defined as the number of contiguous pixels in a block which are assigned the same pattern. For example, if the pattern indices of a block are PAT_IDX={0,0,0,1,2,2, 0,0}, then the run from the leftmost pixel will be 3, and the run from the rightmost pixel will be 2. The value of the run length can be compared to the length of the block by the run to length comparison module 430. If the run is equal to the block length then the run to length comparison module 430 can communicate with the pattern mode disable module 420 to disable pattern mode for the current block. For instance, in some embodiments the pattern mode compression scheme can be part of a larger codec having multiple options for compression of image data. If the run is equal to the block length then the codec may determine that another mode, such as skip mode, can more efficiently compress the data, and so pattern mode can be disabled for the current block.

If the run is less than the block length then the run to length comparison module 430 can send the block data and/or pattern data to the value replacement module 435. Value replacement module 435 can replace the pattern values from the quantized pixels with the original pixel values. The original pixel values can be checked by the maximum difference checker 440 to find the maximum difference value for pixel values in each of the R, G, and B channels. To find the maximum difference value, the maximum difference checker 440 can sort each of the pixel values of the R channel in ascending or descending order and can find the difference between the highest and lowest values. The same can be done for the G and B channels. In one embodiment, for two patterns in the database A and B, the difference can be modeled by δ in the set of equations below.

$$\delta_P = |(A\&0xFF) - (B\&0xFF)| \quad (3)$$

$$\delta_G = |((A>>8)\&0xFF) - ((B>>8)\&0xFF)| \quad (4)$$

$$\delta_B = |((A>>16)\&0xFF) - ((B>>16)\&0xFF)| \quad (5)$$

$$\delta_{max} = \max(\delta_R, \delta_G, \delta_B) \quad (6)$$

The maximum difference values for each of the R, G, and B channels can be output to the maximum difference comparison module 445, which can compare each maximum difference value to a threshold. In one embodiment, the threshold can be 100, the R, G, and B difference values can be sorted, and pattern mode can be disabled if $\delta_{max} < 100$. Accordingly, if the maximum of the R, G, and B channel maximum difference values is lower than the threshold, then the maximum difference comparison module 445 can communicate with the pattern mode disable module 420 to disable pattern mode for the current block. The threshold may be set to detect a foreground object, that is, that at least one of the pixels in the block has a substantially different value from the others. The reason for this is that a foreground object can help to mask some error in the gradient that decoding a block encoded using slope-enabled pattern mode may produce. If there is no foreground object, then slope-enabled pattern mode is more likely to create a visual artifact which is noticeable to human eyes. The threshold of 100 was trained using a set of data intended for pattern slope mode, however other thresholds may be suitable in other embodiments. As discussed above, in some embodiments the pattern mode compression scheme can be part of a larger codec having multiple options for compression of image data, and if the maximum difference value exceeds the threshold then another compression mode, such as predictive or transform coding, may result in greater efficiency for the block.

If at least one of the R, G, and B channel difference values is above the threshold, then the slope pattern enable module 450 enables slope-enabled pattern mode compression for the current block. This can trigger the pattern run length checker 455 to determine a length of run to use for calculating the R, G, and B slopes along all or a portion of the block. In one example, an 8×1 block can have eight pixels, pixel 0 through pixel 7, similar to the current pixel block 310 of FIG. 3.

If the pattern run length checker 455 determines that the pattern index of the first pixel in the block, pixel 0, is equal to the pattern index of the last pixel in the block, pixel 7, then the pattern set module 460 can set a pattern index to PAT Slope ID=PAT_IDX(0). The pattern set module 460 can then calculate the R, G, and B slopes from block index 0 to 7, corresponding to slopes from the leftmost pixel, pixel 0, to the rightmost pixel, pixel 7. If any of the R, G, or B channels are found to have a slope, that is, a difference between the original pixel values of the start and end pixels, then the slope flag set module 465 can set a slope flag bit value to 1.

If none of the R, G, or B channels are found to have a slope, then the slope flag set module 465 can set a slope flag bit value to 0.

If the pattern run length checker 455 determines that the pattern index of the first pixel in the block, pixel 0, is not equal to the pattern index of the last pixel in the block, pixel 7, then the pattern run length checker 455 can compare the length of a pattern run calculated beginning from the left-most pixel to a threshold. If the pattern run length checker 455 determines that the length of a pattern run calculated beginning from the left-most pixel (pixel 0) is greater than the threshold, then the pattern set module 460 can set a pattern index to PAT Slope ID=PAT_IDX(0). In one example having an 8×1 pixel block, the threshold can be four. The pattern set module 460 can then calculate the R, G, and B slopes from block index 0 to a block index corresponding to the threshold, 4, which determines slopes from the left-most pixel, pixel 0, to the pixel 4. In examples having pixel blocks of other sizes, the threshold can be calculated in some embodiments to be half or approximately half of the width of the pixel block, and slopes can be calculated according to the block index corresponding to the threshold. If any of the R, G, or B channels are found to have a slope, then the slope flag set module 465 can set a slope flag bit value to 1. If none of the R, G, or B channels are found to have a slope, then the slope flag set module 465 can set a slope flag bit value to 0.

If the pattern run length checker 455 determines that the length of a pattern run calculated beginning from the left-most pixel is equal to or less than the threshold, then the pattern run length checker 455 can compare the length of a pattern run calculated beginning from the right-most pixel to the threshold. If the pattern run length checker 455 determines that the length of the pattern run from the right-most pixel (pixel 7) to pixel 3 is greater than the threshold, then the pattern set module 460 can set a pattern index to PAT Slope ID=PAT_IDX(7). The pattern set module 460 can then calculate the R, G, and B slopes from block index 7 to a block index 3, which determines slopes from the right-most pixel, pixel 7, to pixel 3. If any of the R, G, or B channels are found to have a slope, then the slope flag set module 465 can set a slope flag bit value to 1. If none of the R, G, or B channels are found to have a slope, then the slope flag set module 465 can set a slope flag bit value to 0.

If the pattern run length checker 455 determines that the length of a pattern run calculated beginning from the right-most pixel is also equal to or less than the threshold, then the pattern run length checker 455 can communicate with the pattern mode disable module 420 to disable pattern mode for the current block. If there is no pattern run length greater than the threshold starting from either edge of the pixel block, then the current block may not contain a gradient and may be compressed more efficiently using another compression mode.

In one embodiment, the slopes for the R, G, and B channels can be calculated using the following formula (shown for the R channel, but the equivalent can be used for the G and B channels) of Equation (7).

$$slope_R(a, b) = \begin{cases} 2, & R_b > R_a + \tau \\ 1, & R_b < R_a - \tau \\ 0, & \text{else} \end{cases} \quad (7)$$

Here, $R_0$ denotes the first red pixel in the current block. The slope is calculated between endpoints a and b, which are block index values (i.e., start and end pixels within the block) determined by the pattern run length checker 455 as specified above. The variable τ denotes a fixed threshold that can be defined in some examples according to Equation (8).

$$\tau = \begin{cases} 4, & b-a=7 \\ 2, & \text{else} \end{cases} \qquad (8)$$

If slope pattern mode is enabled at the end of processing of a pixel block by the slope-enabled pattern module 400, then the current block can be output for compression using slope-enabled pattern mode. If slope pattern mode was disabled during processing of the pixel block by the slope-enabled pattern module 400, then the pixel block can be output in some embodiments for compression by another technique.

Overview of Example Encoding Format

Figure 5:
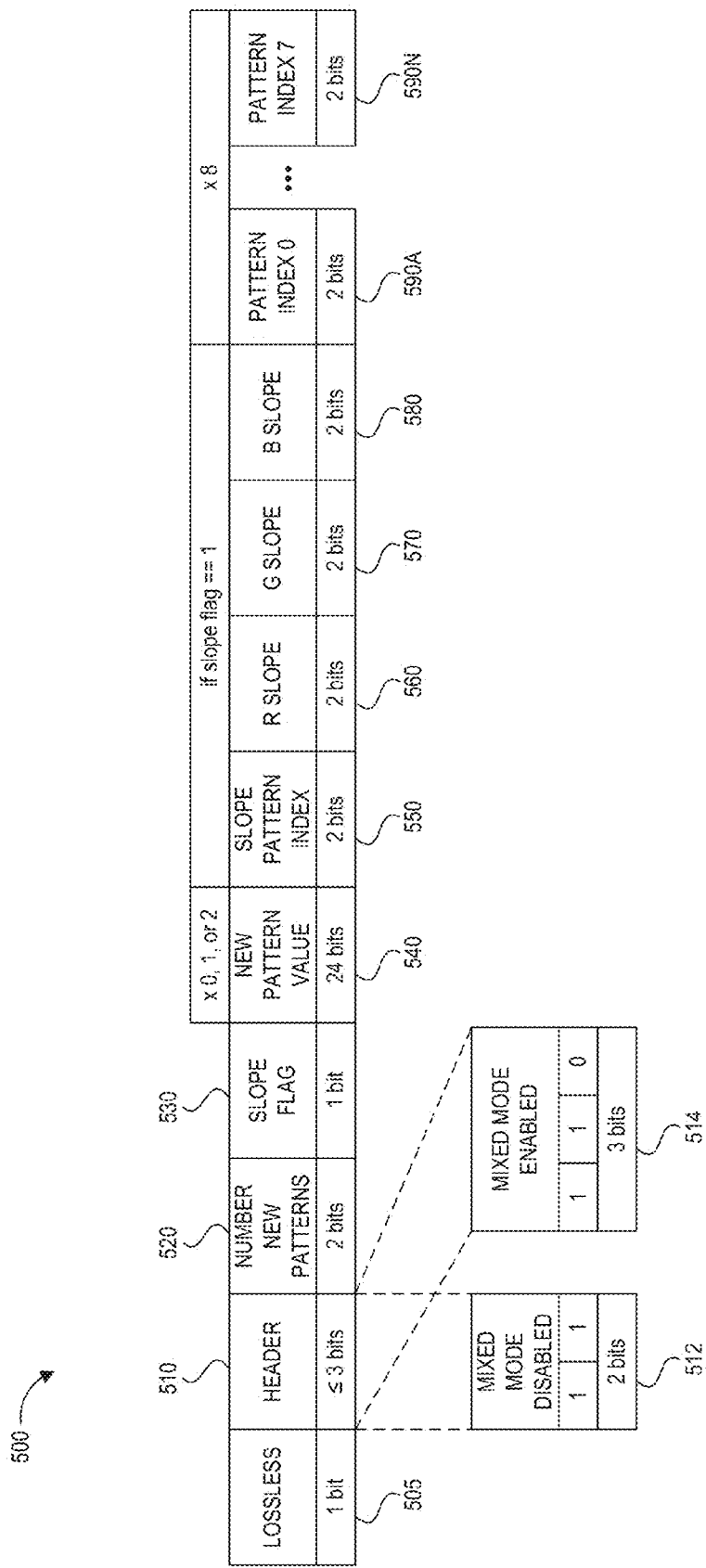
FIG. 5 illustrates an example encoding format that can be generated by the pattern mode compression scheme.

FIG. 5 illustrates an example encoding format 500 for a bitstream that can be generated by the pattern mode compression scheme described herein. The format 500 can include some or all of a lossless indicating field 505, header 510, new pattern number field 520, slope flag 530, one or more new pattern value fields 540, slope pattern index field 550, R slope field 560, G slope field 570, B slope field 580, and a plurality of pattern index fields 590A-590N. Although the various fields are shown in a particular order, this is for illustrative purposes and the fields could be rearranged in other examples. In certain compressed bitstreams only some illustrated fields may be included and some may be omitted.

In the illustrated example, the 1-bit lossless indicating field 505 can indicate whether the bitstream was compressed in a lossless or lossy manner. In other examples, only lossless compression may be used or only lossy compression may be used, and accordingly the lossless indicating field 505 can be omitted in such examples.

The header 510 can be configured as required by the overall encoder/decoder design and can include up to 3 bits of information in certain embodiments. For example, in one embodiment the pattern header 510 can include two bits 512 to indicate that a mixed mode compression was disabled or three bits 514 to indicate that mixed mode compression was enabled. Other embodiments of the header 510 can include fewer or greater bits as required by the system design. To illustrate, pattern mode compression can be one option available in a codec having multiple options for compression of image data. The header 510 can be configured to indicate to a decoder which compression mode was used to generate the bitstream. Accordingly, the syntax of the header 510 can depend on how many different modes are available in the codec.

Still referring to FIG. 5, the new pattern number field 520 indicates a number of new patterns found within the pixel block during pattern search. A 2-bit field can be used in some embodiments for indicating the number of new patterns 520 for the block. For example, this can be 0, 1, or 2 in the example of a 2-bit pattern index and corresponding four entry pattern database including two initial entries from pixel patterns in a previous block. In embodiments having pattern databases of greater than four new pattern entries, more bits can be used for the pattern number field 520.

In some embodiments, the 1-bit slope flag 530 can be set to 1 if slope-enabled pattern mode was used and set to 0 if the pattern mode was used. In other embodiments, the slope flag 530 can be set to 0 if the slope-enabled pattern mode was used and to 1 if the pattern mode was used.

One or more new pattern value fields 540 can be included corresponding to the number of new patterns identified in the new pattern number field 520. For each new pattern in the block, a 24-bit pattern code can be calculated and stored in the bitstream according to Equation (9) in some embodiments.

$$PAT = R + (G << 8) + (B << 16) \qquad (9)$$

In embodiments using color spaces other than 24-bit RGB, each new pattern value field 540 can include fewer or greater than 24 bits corresponding to the image data color space, and the pattern codes can be calculated in an appropriate manner for the color space used. In one example, the new pattern value fields 540 do not include the pattern values from the last two pixels of a previous block for greater efficiency in compressing the data. A decoder operating on the compressed blocks can be configured to keep track of the last two pixel values in a block for subsequent decoding of the next block. In this way, redundant information already known to the decoder is omitted from the compressed pixel block bitstream to provide greater efficiency.

In the example illustrated by Equation (9), color values include data bits for red, green, and blue (RGB) components of the image data, with eight data bits representing each component for a total of 24 bits for the color value. Often known as "truecolor," 24-bit RGB color is the highest color depth normally used, and it is provided as the example of Equation (9) for this reason. However, pattern mode compression can be useful for efficient coding of image data in many other color spaces requiring fewer or greater than 24-bits for the color value of one pixel. For example, some newer graphics cards support 30-bit RGB and higher, and therefore each pixel can have a color value corresponding to ten data bits for each of the R, G, and B components. In systems for display of multispectral or stereoscopic image data, the number of bits per pixel can also vary from the example given of 24 bits. Pattern mode compression can be used to compress image data in a wide range of color spaces, such as $YC_bC_r$, $YC_oC_g$, xvYCC, and HSV, to name a few. Each color space can express the color value of a pixel according to a bit format using a certain number of bits for each color, luminance, brightness, or lightness component. Further, pattern mode compression can be modified to accommodate color values in one or both of additive and subtractive color models in other embodiments.

If the slope flag is set to a value indicating that slope-enabled pattern mode was used to associate each of the pixel values of the block with a pattern index, then the slope pattern index field 550, R slope field 560, G slope field 570, and B slope field 580 can be included in the bitstream. In the illustrated embodiment of FIG. 5, each of these fields is a 2-bit field. The slope pattern index field 550 can indicate the starting pattern index used to determine the slope, as discussed above with respect to the pattern set module 460 of FIG. 4. The R slope field 560, G slope field 570, and B slope field 580 can indicate the slopes calculated along at least a portion of the block for each of the R, G, and B channels, as also is discussed above with respect to the pattern set module 460.

The bitstream can also include a plurality of pattern index fields 590A-590N indicating the pattern index associated with each pixel in the block, as illustrated in FIG. 5. The illustrated example includes eight pattern index fields 590A-590N corresponding to an 8×1 pixel block. Each pattern index field is 2 bits, corresponding to the length of the pattern entry index. The number of pattern index fields can be adapted to other block sizes in other examples, and the bit size for these fields can be adapted to other pattern database sizes in other examples.

The following example illustrates one embodiment of a bitstream length for an 8×1 block having one new pattern and with slope mode not selected, the bitstream coded according to the example encoding format 500. The header length can be 4 bits including the lossless or lossy 1-bit indicator and a 3-bit header indicating that pattern mode compression was used. The number of new patterns is one, adding an additional 2 bits to the bitstream. The slope flag is set to 0, adding 1 additional bit to the bitstream. Encoding a single pattern using the 24-bit pattern code adds an additional 24 bits to the bitstream length. Encoding a 2-bit pattern index for each of the eight pixels in the block adds an additional 16 bits to the bitstream length. Accordingly, the example block having one new pattern and with slope mode not selected can be coded using a total of 47 bits.

The following example illustrates another embodiment of a bitstream length for an 8×1 block having two new patterns and with slope mode selected, the bitstream coded according to the example encoding format 500. The header length can be 4 bits including the lossless or lossy 1-bit indicator and a 3-bit header indicating that pattern mode compression was used. The number of new patterns is two, adding an additional 4 bits to the bitstream. The slope flag is set to 1, adding 1 additional bit to the bitstream. Encoding two patterns using the 24-bit pattern code adds an additional 48 bits to the bitstream length. Encoding the slope parameters adds an additional 8 bits to the bitstream length. Encoding a 2-bit pattern index for each of the eight pixels in the block adds an additional 16 bits to the bitstream length. Accordingly, the example block having two new patterns and with slope mode selected can be coded using a total of 79 bits.

A decoder or decoding module (not illustrated) can decode a bitstream coded according to the example encoding format 500 to reconstruct the original pixel values from the compressed bitstream of the pixel block. One example bitstream can have a slope flag 530 set to 1, a slope pattern index 550 indicating a pattern index of PAT_IDX=0, a R slope field 560 indicating an R slope of 1, a G slope field 570 value indicating an G slope of 0, and a B slope field 580 value indicating an B slope of 2. Further, the example bitstream can have a block pattern index of Block PAT_IDX={0, 0, 0, 2, 2, 0, 0, 1} and three pattern database entries of PAT(0)=(30,180,70), PAT(1)=(25,205,117) and PAT(2)=(28,1,151), respectively. In this example, only pixels with a pattern index of PAT_IDX=0 are part of the slope. The pixel values $X_n$ of the pixels in the block represented by the example bitstream can be decoded as follows:

$X_0 \rightarrow \text{PAT}(0)=(30,180,70)$ $X_1 \rightarrow \text{PAT}(0)=(30,180,70)+(-1,0,1)=(29,180,71)$ $X_2 \rightarrow \text{PAT}(0)=(30,180,70)+2\cdot(-1,0,1)=(28,180,72)$ $X_3 \rightarrow \text{PAT}(2)=(28,1,151)$ $X_4 \rightarrow \text{PAT}(2)=(28,1,251)$ $X_5 \rightarrow \text{PAT}(0)=(30,180,70)+5\cdot(-1,0,1)=(25,180,75)$ $X_6 \rightarrow \text{PAT}(0)=(30,180,70)+6\cdot(-1,0,1)=(24,180,76)$ $X_7 \rightarrow \text{PAT}(1)=(25,205,117)$ Accordingly, the pixel colors of the eight pixels in the decoded block will correspond to values $X_0$ through $X_7$ above.

Overview of Example Pattern Mode Compression Process

Figure 6:
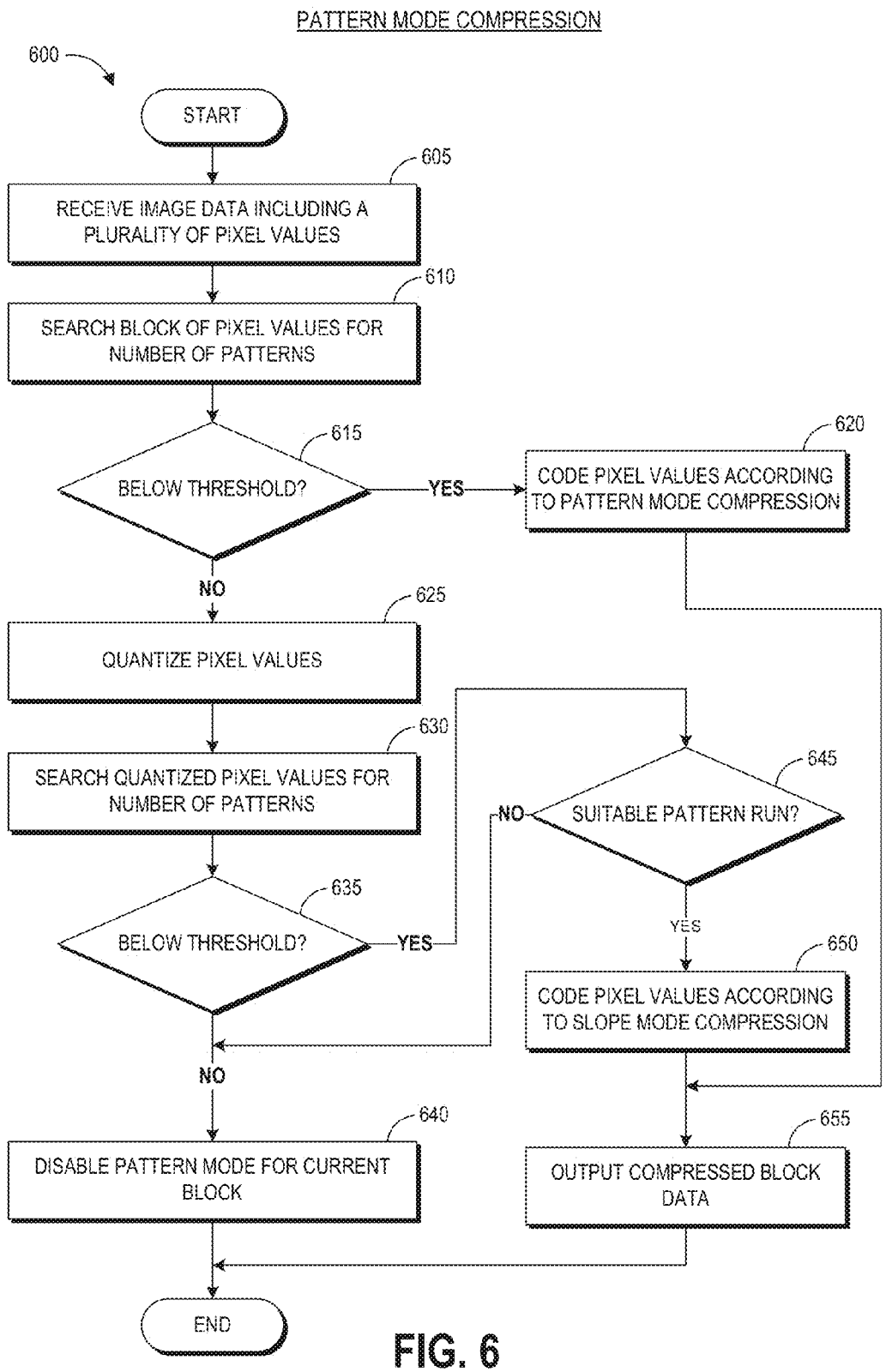
FIG. 6 illustrates an embodiment of an example pattern mode compression process.

FIG. 6 illustrates an embodiment of an example pattern mode compression process 600. For purposes of illustration, the process 600 is discussed as being implemented by the components and modules of FIG. 1 and FIG. 4. However, the process 600 can also be implemented by the compression unit 215 of FIGS. 2A-2C and by any system with the pattern mode compression capabilities as described herein. The blocks illustrated for process 600 may be appropriately combined consistent with the disclosure herein and still be in scope of the innovations described herein. For example, to illustrate an embodiment that includes a process for searching for patterns in image data, determining to apply a certain pattern compression technique, and coding the image data to produce compressed image data using the selected compression technique, or a system having components configured for such functionality. Additional processes or components can also be included, in various embodiments.

Referring to FIG. 6, at block 605, the pattern module 150 can receive image data, for example image data segmented into a plurality of blocks. At block 610, the pattern search module 110 can search a block of pixels to determine a number of patterns in the block. An example pattern search 300 is discussed in more detail above with respect to FIG. 3. For example, the pattern search module 110 can compare each pixel in a current block of the image data 105 against entries in a pattern database. As discussed above, for each block, the components of the pattern module 150 can consider a maximum number of patterns, where each pattern represents the RGB color of a pixel in a single 24-bit code. In one example, each pattern database entry can contain a 24-bit code corresponding to an RGB color and an associated fixed-length 2-bit index code. In this example there is a maximum allowable number of two new patterns per block, as the 2-bit index code can only accommodate four distinct entries. Two initial pattern database entries can be generated by using the RGB color values of the last two pixels of a previous block, which are placed into pattern slots 0 and 1, and further pattern values can be generated based on new color values in the current block. Other pattern database and pattern index parameters can be used in other embodiments of the pattern search.

The pattern search module 110 can search a pixel by calculating the pattern corresponding to the pixel color value and comparing the pattern to the entries in the pattern database. As the search module 110 finds entries in the pattern database corresponding to the patterns of the pixels in the block, the pattern module 150 can build a block pattern index indicating which pixels are associated with which pattern entries. New patterns can be added to the database up to a maximum allowable number of new patterns.

After all pixels in the block have been associated with a pattern index, or if more than the maximum number of new patterns is found in the block, the process 600 can transition to block 615. At block 615, the pattern mode decision module 115 can determine whether the number of new patterns is equal to or below a threshold corresponding to the maximum allowable number of new patterns. If the number of new patterns is equal to or below the threshold, then the process 600 can transition to block 620. At block 620, the pattern mode coder 120 can code the block according to pattern mode compression, as is discussed in more detail above with respect to FIG. 5. The process 600 can then transition to block 655 to output the compressed block data, for example for storage in a frame buffer and/or rendering on a panel display.

If, at block 615, the pattern mode decision module 115 determines that the number of new patterns is greater than the threshold, then the process 600 of FIG. 6 can transition to block 625 to attempt a slope-enabled pattern search that accommodates the pixel values in a block with a gradient. At block 625, the block quantizer 405 of FIG. 4 can quantize the pixel color values. At block 630, the slope pattern search module 125 can perform a pattern search of the quantized pixel values, for example according to the pattern search 300 discussed in more detail above with respect to FIG. 3.

After all pixels in the block have been associated with a pattern index, or if more than the maximum number of new patterns is found in the block, the process 600 can transition to block 635. At block 635, the slope mode decision module 130 can determine whether the number of new patterns is equal to or below a threshold corresponding to the maximum allowable number of new patterns. If, at block 635, the slope mode decision module 130 determines that the number of new patterns is greater than the threshold, then the process 600 of FIG. 6 can transition to block 645. At block 645, the pattern run length checker 455 can determine whether a pattern run is appropriate for slope-enabled pattern mode compression, as discussed above with respect to FIG. 4. If the block contains a suitable pattern run, as described above, then the pattern set module 460 can determine an appropriate pattern index to as well as the R, G, and B slopes for the segment of the block corresponding to the pattern index and the run length threshold. In addition, the slope flag set module 465 can analyze the values of the R, G, and B slopes and set a corresponding slope flag value. The process 600 can then transition to block 650.

At block 650, the slope mode coder 135 can code the block according to slope-enabled pattern mode compression, as is discussed in more detail above with respect to FIG. 5. The process 600 can then transition to block 655 to output the compressed block data, for example for storage in a frame buffer and/or rendering on a panel display.

If, at block 635, the slope mode decision module 130 determines that the number of new patterns is greater than the threshold, then the process 600 of FIG. 6 can transition to block 640 to disable pattern mode for the current block. In addition, if, at block 645, the pattern run length checker 455 determines that there is no suitable pattern run in the block for slope-enabled pattern mode compression, then the process 600 can transition to block 640 to disable pattern mode for the current block. Although not illustrated, the process 600 can output the data for a different type of compression more suited to the contents of the block.

Example Visual Quality Results

Figure 7:
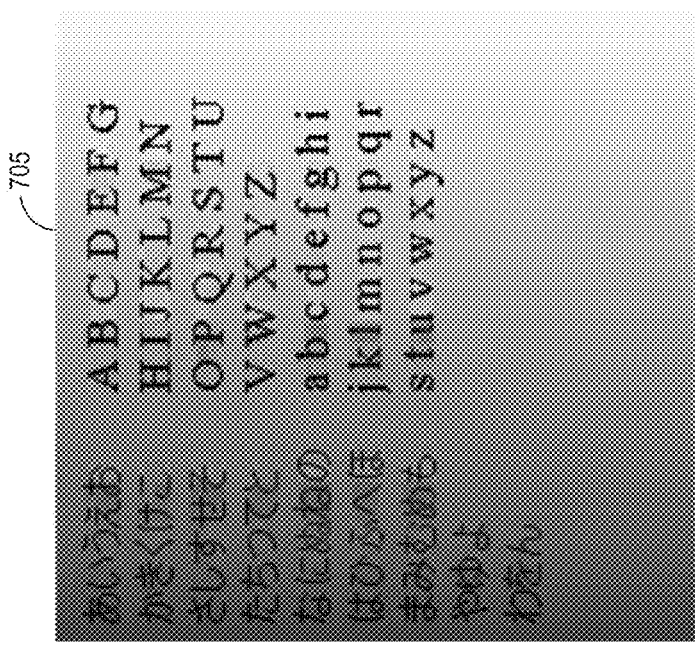
FIG. 7 illustrates a comparison of a first image not generated by a pattern mode compression process and a second image generated by the pattern mode compression process.
Figure 7:
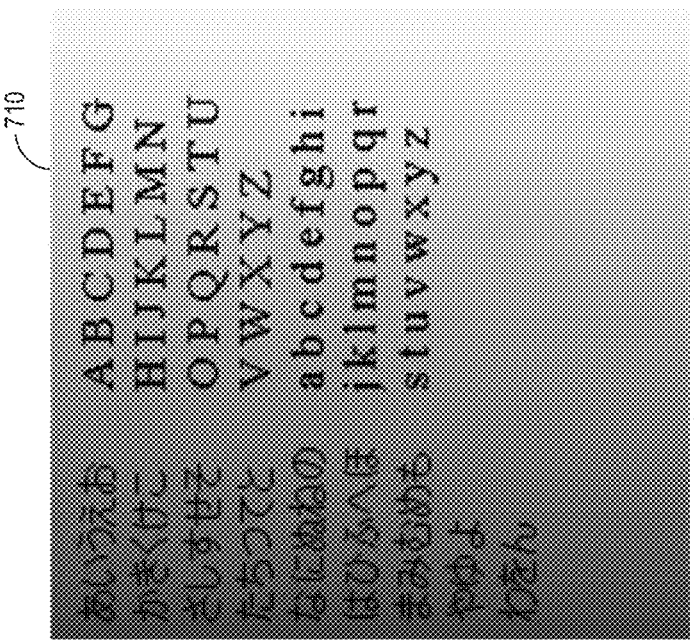

FIG. 7 illustrates a comparison of a first image not generated by a pattern mode compression process and a second image generated by the pattern mode compression process. Image 705 was generated with pattern mode disabled and has a peak signal-to-noise ratio (PSNR) of approximately 34.138 dB. Image 710 was generated with pattern mode enabled and has a PSNR of approximately 51.450 dB. PSNR is a traditional objective metric for evaluating quality of a processed image, representing ratio between the peak signal-to-noise of the original image and the peak signal-to-noise of the image after being processed by an image processing system. The higher the PSNR value, the better the quality of the compressed or reconstructed image. Therefore, the image 710 generated with pattern mode enabled has an objectively higher visual quality than the image 705 generated with pattern mode disabled, according to the PSNR metric.

The subjective, or perceived, visual quality difference between images 705 and 710 is also apparent by noting the artifacts and discoloration present in image 705 that are not present in image 710.

Implementing Systems and Terminology

Implementations disclosed herein provide systems, methods and apparatus for compressing image data. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for compressing image data in an electronic device, the method comprising:
   receiving a pixel block having a plurality of pixels, each of the plurality of pixels associated with a color value;
   generating a pattern database comprising a plurality of entries, the pattern database having a maximum number of available entry locations, a populated entry of the plurality of entries including a database pattern value associated with an index code;
   performing a pattern search by comparing a pixel pattern value generated from a color value of a searched pixel of the plurality of pixels to the database pattern value of at least a first populated entry in the pattern database;
   determining whether the pixel pattern value is equal to the database pattern value;
   associating the searched pixel with the index code in a corresponding populated entry if the pixel pattern value is equal to the database pattern value;
   updating the pattern database with a new pattern entry based on the color value of the searched pixel if the pixel pattern value is not equal to the database pattern value;
   terminating the pattern search if the pixel pattern value is not equal to any database pattern value and a number of populated entries in the pattern database equals the maximum number of available entry locations; and
   performing a slope-enabled pattern search if the pattern search is terminated, wherein the slope-enabled pattern search comprises
   quantizing color values of each of the plurality of pixels, and
   performing the pattern search by comparing a quantized color value to the database pattern value of at least a first populated entry in the pattern database.

2. The method of claim 1, wherein generating the pattern database comprises:
   generating a first database pattern value from a previous color value associated with a pixel of a previous block; and
   populating a first populated entry of the pattern database to include the first database pattern value and a first index code.

3. The method of claim 1, further comprising generating a compressed pixel block using pattern encoding based at least partly on results of the pattern search.

4. The method of claim 3, wherein a bitstream representing the compressed pixel block includes a bit indicating that the pattern search was performed on the quantized color value.

5. The method of claim 1, further comprising determining a slope for each of a plurality of color channels of the pixel block along at least a portion of the pixel block, wherein the slope indicates a difference in gradient values between a starting pixel and an end pixel of a corresponding color channel.

6. A non-transitory computer-readable medium storing instructions that, when executed, cause at least one physical computer processor to perform a method of compressing image data, the method comprising:
- generating a pattern database comprising a plurality of entries, the pattern database having a maximum number of available entry locations, a populated entry including a database pattern value associated with an index code;
- performing a pattern search of a pixel block comprising a plurality of pixels by comparing a pixel pattern value generated from a color value of a searched pixel of the plurality of pixels to the database pattern value of at least a first populated entry in the pattern database;
- determining whether the pixel pattern value is equal to the database pattern value;
- updating pattern data, wherein if the pixel pattern value is equal to the database pattern value, updating the pattern data comprises associating the searched pixel with the index code in a corresponding populated entry, and wherein if the pixel pattern value is not equal to the database pattern value, updating the pattern data comprises updating the pattern database with a new pattern entry based on the color value of the searched pixel;
- terminating the pattern search if the pixel pattern value is not equal to any database pattern value and a number of populated entries in the pattern database equals the maximum number of available entry locations; and
- performing a slope-enabled pattern search if the pattern search is terminated, the slope-enabled pattern search comprising
  - quantizing color values of each of the plurality of pixels, and
  - performing the pattern search by comparing a quantized color value to the database pattern value of at least a first populated entry in the pattern database.

7. The non-transitory computer-readable medium of claim 6, wherein the method further comprises generating a compressed pixel block using pattern encoding based at least partly on results of the pattern search.

8. The non-transitory computer-readable medium of claim 7, wherein the method further comprises decoding the compressed pixel block to obtain the color values of each of the plurality of pixels.

9. An apparatus for compressing image data in an electronic device, the apparatus comprising:
- means for generating a pattern database comprising a plurality of entries up to a maximum number of available entries, a populated entry including a database pattern value associated with an index code;
- means for performing a pattern search of a pixel block comprising a plurality of pixels by comparing a pixel pattern value generated from a color value of a searched pixel of the plurality of pixels to the database pattern value of at least a first populated entry in the pattern database;
- means for updating pattern data based at least partly on whether the pixel pattern value is equal to the database pattern value, the pattern data for a searched pixel of the plurality of pixels including association of the searched pixel with a corresponding index code if the pixel pattern value matches the database pattern value, the pattern data for the searched pixel including a new pattern entry in the pattern database if the pixel pattern value does not match any database pattern value;
- means for terminating the pattern search if the pixel pattern value is not equal to any database pattern value and a number of populated entries in the pattern database equals the maximum number of available entry locations; and
- means for performing a slope-enabled pattern search if the pattern search is terminated, wherein the slope-enabled pattern search is configured to quantize the color value of each of the plurality of pixels and perform the slope-enabled pattern search by comparing each of the quantized color values to the database pattern value of at least the first populated entry in the pattern database.

10. The apparatus of claim 9, further comprising means for generating a compressed pixel block using pattern encoding based at least partly on results of the pattern search.

11. The apparatus of claim 10, further comprising means for decoding the compressed pixel block to obtain color values of the plurality of pixels.

* * * * *